United States Patent [19]

Pitsch et al.

[11] Patent Number: 4,771,160
[45] Date of Patent: Sep. 13, 1988

[54] WELDING TONGS

[75] Inventors: Franz F. Pitsch, Moerfelden-Walldorf; Lothar Ulrich, Herrenberg, both of Fed. Rep. of Germany

[73] Assignee: Lothar Schmitt GmbH, Dreieich, Fed. Rep. of Germany

[21] Appl. No.: 883,109

[22] Filed: Jul. 8, 1986

[30] Foreign Application Priority Data

Jul. 8, 1986 [DE] Fed. Rep. of Germany ....... 3524342

[51] Int. Cl.⁴ ............................................. B23K 11/00
[52] U.S. Cl. ................................... 219/90; 219/86.25; 219/89
[58] Field of Search .......................... 219/90, 89, 86.25

[56] References Cited

U.S. PATENT DOCUMENTS

4,551,605 11/1985 Numata et al. ....................... 219/90

FOREIGN PATENT DOCUMENTS

| 2153536 | 5/1973 | Fed. Rep. of Germany | 219/89 |
| 1072 | 1/1984 | Japan | 219/89 |
| 674849 | 7/1979 | U.S.S.R. | 219/90 |

OTHER PUBLICATIONS

Cadwallader, R. and Hazel, K., "Memory Plane Terminal Welder", IBM Disclosure Bulletin, vol. 8, No. 4, Sep. 1965, pp. 516–517.

Primary Examiner—E. A. Goldberg
Assistant Examiner—C. M. Sigda
Attorney, Agent, or Firm—Ralf H. Siegemund

[57] ABSTRACT

Welding tongs for dot or spot welding having two arms which are disposed without crossing relationship and carrying weld electrodes respectively on one end. The arms are made of flat, spaced bars, and a substantially flat spacing member made of an elastic or resilient material, spaces the two arms from each other thereby interconnecting the tong arms in a range of pivot motion of the arms. An E-shaped mounting member limits lateral deflection of the tong arms and holds the spacing member. A hydraulic drive is connected to the other ends of the tong arms for obtaining the pivot motion of the arms in relation to each other, through tensioning and upsetting or compression of the spacing member.

9 Claims, 1 Drawing Sheet

WELDING TONGS

BACKGROUND OF THE INVENTION

The present invention relates to welding tongs particularly for dot or spot welding in an automated environment using an actuator which is arranged at a location with respect to the tongs rather remote, even facing away from the welding point.

Welding tongs of the type to which the invention pertains are usually of scissors-like construction wherein the arms of the tongs are crimped at the point of crossing or lever arms connected with the arms of the tongs are suitably formed and are pivotable mounted at the point of crossing for pivoting about a common axis. generally speaking this kind of an arrangement is disadvantaged by the fact that during operation of the tongs the bearings for either the tong arms or the lever arms have to take up the full welding pressure. Accordingly they have to be designed to be able to withstand that kind of load while on the other hand they will wear rather heavily.

DESCRIPTION OF THE INVENTION

It is an object of the invention to provide a new and improved type of pivoted mounting for the arms of welded tongs wherein the improvement relates towards the reduction of wear so as to substantially eliminate the problem of early wear.

In accordance with the preferred embodiment of the present invention it is a feature thereof to avoid crossing of these arms or of any other arms connected to the tongs arms; rather by means of a spacer member or body made of a resilient or elastic material for example a rubber blend. The arms are interconnected in an area of zone of common relative pivoting.

In order to avoid lateral tilting of the arms it is suggested to provide a general support and mounting element constructed for lateral retention of the tong arms. The tong arms may be constructed each from spaced flat bars and the support element grips into the space between the bars to prevent lateral deflection.

In accordance with further features of the invention the latter mounting element is provided with holding straps and the particular spacer body element is held between these straps. An additional (lose) connection is provided centrally through a pin traversing the strap elements and the body entirely and providing pivotable connection. This feature on one hand prevents lateral displacement of the spacer member or element while on the other hand escape in the (longitudinal) direction, towards the welding point or the operating member of the tong is avoided. The rotatable connection between mounting element and spacer member avoids exertion of an undesired torque upon the spacer member at the point of connection. In order to enhance and increase elasticity and resiliency of the spacer member it is provided with a central width reduction in a symmetrical fashion in relation to the tong arms. In case very high loads occur the bearing member has to be protected against extensive tension. Accordingly tension limiting elements are embedded in that spacer member such as a metallic chain or wires or the like.

The invention offers the following advantages. On one hand the wear on any supported bearing points is actually avoided so that the inventive welding tong is freed from the maintenance requirement having to do with wear on any support point. This in turn increases the use life of such welding tongs over those of known construction. On the other hand the invention provides for a rather soft engagement of the electrodes with the weld pieces, simply because the elastic or resilient spacer member intercepts so to speak the first impact. This feature avoids bouncing of the electrodes and is advantageous as far as the welding process itself is concerned. As a side effect the noise that is usually inherent in dot welding is avoided or at least significantly reduced.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
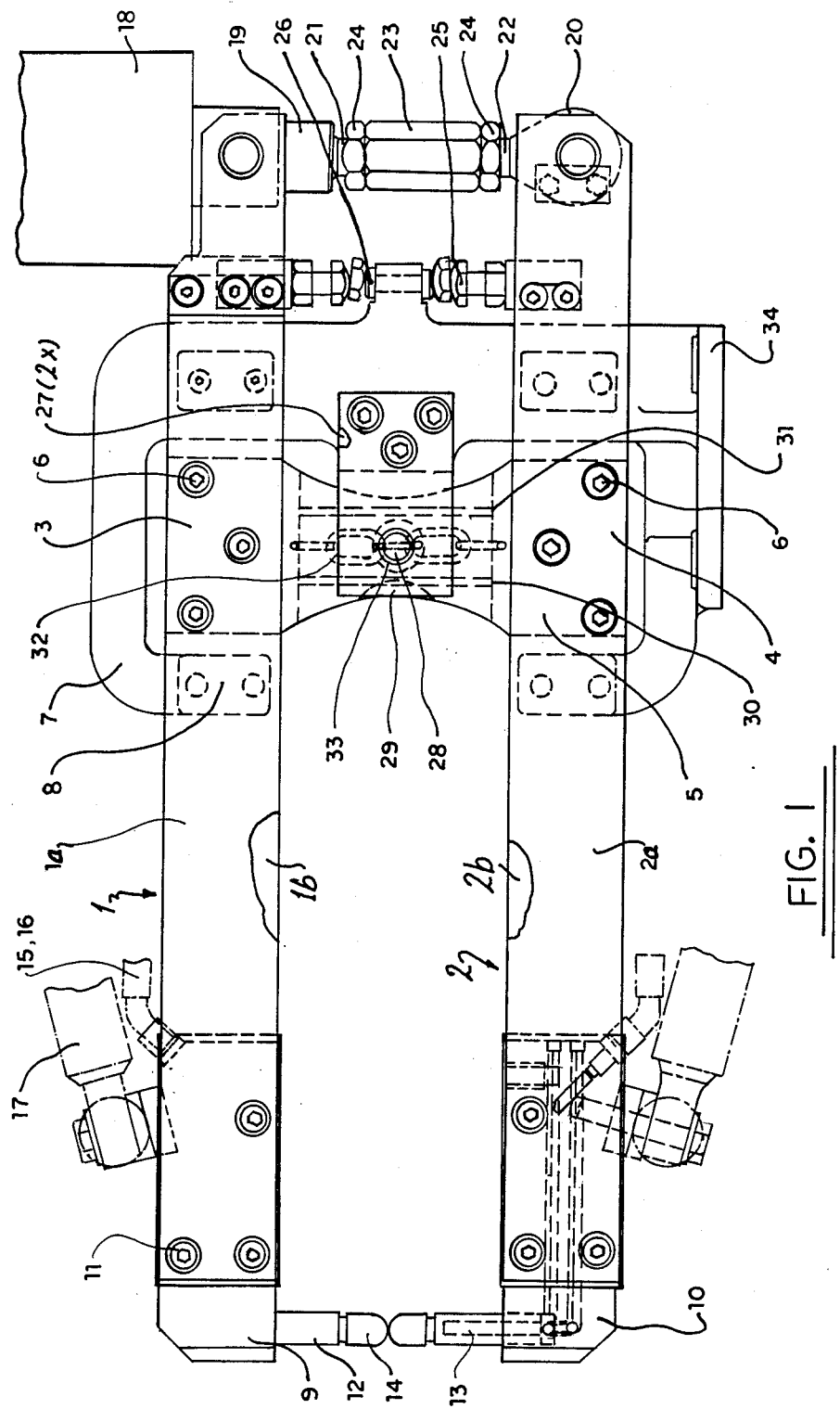
FIG. 1 is a somewhat schematic showing of a welding tong constructed in accordance with the preferred embodiment of the present invention for practicing the best mode thereof. The drawings illustrate specifically a side view of such a welding tong.

Proceeding to the detailed description of the drawings reference numerals 1 and 2 respectively denote the two tong arms for such a dot or spot welding tongs. Each of these arms 1 and 2 is made from two essentially similar flat parts such as 1a and 1b, for arm 1, 2a and 2b for arm 2. Between each of these pairs of flat bars connecting and spacing pieces are provided. The bars of arms 1 are interconnected by a connecting piece 3 and the bars of arm 2 are interconnected by spacing piece 4. These pieces 3 and 4 are actually integral parts of the member 5 being made of a rubber blend and serving as mounting and connecting member for arms 1 and 2 and serving also as spacer for these arms. By means of internal hex bolts 6 the pieces 3 and 4 of the mounting and connecting member 5 are connected to these bars of arms 1 and 2. Initially the central part of the spacer and mounting member 5 may have been separate from the two pieces 3 and 4 but have been combined through vulcanization. For practical purposes mounting and connecting 5 is a single piece element.

A mounting member 7 of E-shaped configuration is in parts arranged between the flat bar elements (1a, 1b etc.) The E-shaped mounting member extends in the gap space between the flat of which the arms 1 and 2 are made. The mounting member 7 is provided with a mounting plate 34 by means of which the entire tongs are fastened to a suitable support in the work hall or the like.

Member 7 grips around the spacer member 5 so that the tong arms 1 and 2 can move relative to the mounting member 7. On the other hand the mounting member 7 establishes lateral limits for lateral deflection of the bars of 1 and 2 and for this purpose abutment and sliding surfaces such as 8 are provided on the extreme ends of the upper and lower leg of the E as well as adjacent the roots of these legs. Surfaces 8 permit on one hand abutment against the respective flat bars of which the arms 1 and 2 are made while permitting relative low friction movement of these parts basically in the plane of the drawings. Holding straps 27 extend from the very short center leg of the E and hold the center of spacer 5 in between. A retention and pivot pin 28 traverses the straps and spacer 5 in its center.

At one end of the two arms 1 and 2 are mounted electrode holders such 9 and 10. These holders are basically mounted between the two flat parts of which each arm is made i.e. between 1a and 1b as far as the electrode holder 9 is concerned and between the parts 2a and 2b as far as the electrode holder 10 is concerned. The connection is made through internal screws 11. The electrode holders 9 and 10 receive electrode shanks 12 and 13 which in turn carry electrode caps 14. Each of these holders 9 and 10 is connected to conduits 15 and 16 for running cooling water to these holders. Reference numeral 17 refers to connections leading to the terminals of the secondary winding of a welding transformer.

The spacer mounting and connecting member 5 will not deflect or escape during operation of the welding tongs, either in lateral direction or axially, on account of the holding straps 27; they are aligned with the center of bearing and mounting member 5 by means of pin 28. The connection thus made permits rotation and this way it is avoided that an undesired torque is exerted upon the spacer member 5 at the point of connection. In order to enhance or increase the elasticity and resiliency of the spacer member 5 its central part 5a is symmetrically reduced in widths in the plane the drawing. A further increase of elasticity or resiliency of the member 5 will become effective during closing of the welding tongs and can be obtained in that the member 5 where facing the electrodes is further reduced in width right in the center and as illustrated by the dash-dot line identified by reference numeral 29. This feature moreover provides for a still softer engagement of the electrodes with the work pieces to be welded together.

In order to protect the spacer member 5 against excess tension two metal wires 30 and 31 are embedded in the body 5a. In lieu of these wires one could use chains. In the alternative a single chain 32 may be provided being fastened to the connecting pieces 3 and 4 and being run through a bore 33 of the pin 28.

An operating member or actuator is connected to the opposite ends (right hand portion or the drawings) of the arms 1 and 2. This operating member is comprised of a piston cylinder drive being generally disposed between the arms 1 and 2 and is pivotally linked to both of them. A connection at the cylinder 18 of the drive connects for example to the arm 1 and an eye-like part 20 of a piston rod extension is connected to the arm 2. Again the respective connect parts are disposed in between the flat elements of which the respective arms are made. The piston rod 19 and the eye 20 each have threaded end portion 21 and 22 respectively which are interconnected by means of fairly long nut 23. This arrangement can be deemed on one hand the connection between the eye 20 and the piston rod 19 or alternatively this part can be considered a length variable extension of the piston rod 19 itself. In any event the spacing between the invariable piston rod portion 19 and the eye 20 can be adjusted through these threaded connections whereby counter nuts 24 are provided to fix the adjusting position.

In the beginning of the welding process piston rod 19 is retracted into the cylinder 18. As a consequence support and spacing member 5 is upset or compressed to some extent alonog the side facing the cylinder, piston drive while put under tension is on the side of the member 5 that faces the electrodes. Accordingly a pivot motion occurs about the axis of pin 28 such that the electrodes caps 14 separate. In order to limit the upset motion, limit pins 25 are provided which upon retraction of the piston rod 19 into the cylinder 18, engage at some point in time during the operation limit stops 26. These stops 26 are arranged on the E-shaped mounting member 7 and prevent further pivot motion of the arms 1 and 2.

As far as the welding process is concerned the welding tongs are, so to speak, opened by the piston rod retraction and the work pieces to be welded together are now shifted in between the two caps 14. Thereafter piston rod 19 will be caused to protract from the cylinder 18. As a consequence the spacer member 5 will now be placed under tension on the side facing the hydraulic drive while the side of the spacer member 5 facing the electrodes is upset or compressed. As a consequence the tongs are closed, the electrode caps 14 engage gently the work piece or pieces to be welded without rebounding and exert thereupon the requisite welding pressure.

The invention is not limited to the embodiments described above but all changes and modifications thereof, not constituting departures from the spirit and scope of the invention, are intended to be included.

We claim:

1. Welding tongs for dot or spot welding comprising first and second tong arms disposed without crossing relationship and carrying on one end welding electrodes;
    a substantially flat mounting and connecting member made of an elastic or resilient material, also spacing said first and second tong arms from each other within a range of a pivot for a pivot motion, thereby mounting and elastically interconnecting the first and second tong arms in relation to each other and in the range of said pivot of the pivot motion; and
    operating means connected to said first and second tong arms for obtaining relative pivot motion of said first and second arms in relation to each other within an area and location of said connecting member and by tensioning and upsetting or compressing said mounting and connecting member.

2. Welding tongs as in claim 1 and including in addition an E-shaped mounting member for limiting lateral deflection of said first and second tong arms.

3. Welding tongs as in claim 2 wherein each of said first and second tongs arms is made of two spaced apart, flat bar elements, said mounting and connecting member being inserted in between the respective two flat bar elements for connection to the respective first and second tong arm, said E-shaped mounting member having portions extending between the respective two bar members of each of the first and second tong arms.

4. Welding tongs as in claim 3 wherein a pin is provided to traverse said mounting and connecting member, there being strap pieces connected to said E-shaped member for mounting said pin in between, said pin being disposed on a pivot axis for said first and second tong arms.

5. Welding tongs as in claim 3 and including pivot motion limiting means for limiting pivotal deflection of said welding first and second tong arms, said limiting means being connected to said E-shaped member.

6. Welding tongs as in claim 1 wherein a width of said mounting and connecting member is reduced in a central portion as between said first and second tong arms.

7. Welding tongs as in claim 6 said mounting and connecting member having an additional width reduction where facing said electrodes.

8. Welding tongs as in claim 1 and including means embedded in said mounting and connecting member for limiting the permissible tension the mounting and connecting network may undergo on operation of the tongs.

9. Welding tongs as in claim 8 said tension limiting means being metallic elongated flexible elements.

* * * * *